United States Patent [19]
Tran

[11] Patent Number: 5,900,012
[45] Date of Patent: May 4, 1999

[54] STORAGE DEVICE HAVING VARYING ACCESS TIMES AND A SUPERSCALAR MICROPROCESSOR EMPLOYING THE SAME

[75] Inventor: Thang M. Tran, Austin, Tex.

[73] Assignee: Advanced Micro Devices, Inc., Sunnyvale, Calif.

[21] Appl. No.: 08/933,270

[22] Filed: Sep. 18, 1997

Related U.S. Application Data

[63] Continuation of application No. 08/438,399, May 10, 1995, abandoned.

[51] Int. Cl.$^6$ .................................................. G06F 12/00
[52] U.S. Cl. ........................................... 711/120; 711/154
[58] Field of Search .................................. 711/122, 120, 711/123, 154

[56] References Cited

U.S. PATENT DOCUMENTS

| | | |
|---|---|---|
| 4,044,338 | 8/1977 | Wolf . |
| 4,453,212 | 6/1984 | Gaither et al. . |
| 4,807,115 | 2/1989 | Torng . |
| 4,858,105 | 8/1989 | Kuriyama et al. . |
| 5,226,126 | 7/1993 | McFarland et al. . |
| 5,226,130 | 7/1993 | Favor et al. . |
| 5,261,066 | 11/1993 | Jouppi ..................................... 395/449 |
| 5,317,718 | 5/1994 | Jouppi ..................................... 395/464 |
| 5,388,224 | 2/1995 | Maskas ................................... 395/284 |
| 5,526,510 | 6/1996 | Akkary ................................... 395/460 |
| 5,530,958 | 6/1996 | Agarwal .................................. 395/403 |

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," pp. 2–1 through 2–4.

Michael Slater, "AMD's K5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes On Intel P6," BYTE, Jan. 1996, 4 pages.

Selective Victim Caching: a method to improve performance, Stiliadis et al, System Sciences 1994 Annual Hawaii Intl Conference.

Jouppi, Norman, "Tradeoffs in Two–Level On–Chip Caching", *IEEE 1994*, pp. 34–45.

*Primary Examiner*—Tod R. Swann
*Assistant Examiner*—Christopher S. Chow
*Attorney, Agent, or Firm*—Conley, Rose & Tayon, PC; B. Noel Kivlin

[57] ABSTRACT

A storage device having varying access times is provided. The storage device incorporates a direct-mapped cache and a set-associative cache, which are accessed in parallel. If a hit occurs in the direct-mapped cache, then the data is forwarded in the same clock cycle as the requested address is conveyed to the storage device. If a hit occurs in the set-associative cache, then the data is forwarded in a subsequent clock cycle and the associated cache line is moved into the direct-mapped cache. The cache line stored in the direct-mapped cache in the storage location that is to be used for the cache line being moved is stored into the set-associative cache in the location vacated by the moved line. In this manner, the most recently accessed cache line is stored in the direct-mapped cache and other recently accessed cache lines are stored in the set-associative cache.

6 Claims, 3 Drawing Sheets

STORAGE DEVICE HAVING VARYING ACCESS TIMES AND A SUPERSCALAR MICROPROCESSOR EMPLOYING THE SAME

This application is a continuation of application Ser. No. 08/438,399, filed May 10, 1995 (now abandoned).

BACKGROUND OF THE INVENTION

1. Field of the Invention

This invention relates to the field of superscalar microprocessors and, more particularly, to storage devices within superscalar microprocessors.

2. Description of the Relevant Art

Superscalar microprocessors achieve high performance by simultaneously executing multiple instructions in a clock cycle and by specifying the shortest possible clock cycle consistent with the design. As used herein, the term "clock cycle" refers to an interval of time during which the pipeline stages of a microprocessor preform their intended functions. At the end of a clock cycle, the resulting values are moved to the next pipeline stage.

Since superscalar microprocessors execute multiple instructions per clock cycle and the clock cycle is short, a high bandwidth memory system is required to provide instructions and data to the superscalar microprocessor (i.e. a memory system that can provide a large number of bytes in a short period of time). Without a high bandwidth memory system, the microprocessor would spend a large number of clock cycles waiting for instructions or data to be provided, then would execute the received instructions and/or the instructions dependent upon the received data in a relatively small number of clock cycles. Overall performance would be degraded by the large number of idle clock cycles. However, superscalar microprocessors are ordinarily configured into computer systems with a large main memory composed of dynamic random access memory (DRAM) cells. DRAM cells are characterized by access times which are significantly longer than the clock cycle of modern superscalar microprocessors. Also, DRAM cells typically provide a relatively narrow output bus to convey the stored bytes to the superscalar microprocessor. Therefore, DRAM cells provide a memory system that provides a relatively small number of bytes in a relatively long period of time, and do not form a high bandwidth memory system.

Because superscalar microprocessors are typically not configured into a computer system with a memory system having sufficient bandwidth to continuously provide instructions and data, superscalar microprocessors are often configured with caches. Caches are storage devices containing multiple blocks of storage locations, configured on the same silicon substrate as the microprocessor or coupled nearby. The blocks of storage locations are used to hold previously fetched instruction or data bytes. The bytes can be transferred from the cache to the destination (a register or an instruction processing pipeline) quickly; commonly one or two clock cycles are required as opposed to a large number of clock cycles to transfer bytes from a DRAM main memory.

Caches may be organized into an "associative" structure. In an associative structure, the blocks of storage locations are accessed as a two-dimensional array having rows and columns. When a cache is searched for bytes residing at an address, a number of bits from the address are used as an "index" into the cache. The index selects a particular row within the two-dimensional array, and therefore the number of address bits required for the index is determined by the number of rows configured into the cache. The addresses associated with bytes stored in the multiple blocks of a row are examined to determine if any of the addresses stored in the row match the requested address. If a match is found, the access is said to be a "hit", and the cache provides the associated bytes. If a match is not found, the access is said to be a "miss". When a miss is detected, the bytes are transferred from the memory system into the cache. The addresses associated with bytes stored in the cache are also stored. These stored addresses are referred to as "tags" or "tag addresses".

The blocks of memory configured into a row form the columns of the row. Each block of memory is referred to as a "way"; multiple ways comprise a row. The way is selected by providing a way value to the cache. The way value is determined by examining the tags for a row and finding a match between one of the tags and the requested address. A cache designed with one way per row is referred to as a "direct-mapped cache". In a direct-mapped cache, the tag must be examined to determine if an access is a hit, but the tag examination is not required to select the which bytes are transferred to the outputs of the cache. Since only an index is required to select bytes from a direct-mapped cache, the direct-mapped cache is a "linear array" requiring only a single value to select a storage location within it.

Both direct-mapped and associative caches are employed in high frequency (i.e. short clock cycle) superscalar microprocessors. In high frequency applications, set associative caches become a clock cycle limiter because the comparison of tags to the request address and the subsequent selection of data bytes to convey to the output requires more time than the desired clock cycle time allows. Direct-mapped caches, which compare the selected tag to the request address in parallel with conveying data bytes to the output, operate in less time than the associative cache. Unfortunately, direct-mapped caches are associated with lower hit rates (i.e. the percentage of access that are hits) than associative caches with a similar storage capacity. Furthermore, direct-mapped caches are more susceptible to "thrashing". Thrashing is a phenomenon that occurs when the pattern of address requests presented to the cache contains several dissimilar addresses with the same index. Dissimilar addresses are addresses that are stored in the cache with different tags. As an illustrative example, addresses A and B may access the cache alternately and repeatedly. Address A and address B have the same index, and access a direct-mapped cache. First, address A accesses the cache and misses. The indexed cache storage location is filled with bytes associated with address A. Next, address B accesses the cache and misses. The indexed cache storage location discards the bytes associated with address A and is filled with bytes associated with address B. Address A accesses the cache again, and misses. The cache storage location discards the bytes associated with address B and is filled with bytes associated with address A. An associative cache would be able to store bytes associated with both address A and address B simultaneously. A storage device having the access time of a direct-mapped cache with the hit rate and insensitivity to thrashing of an associative cache is desired.

SUMMARY OF THE INVENTION

The problems outlined above are in large part solved by a storage device in accordance with the present invention. The storage device incorporates a direct-mapped cache and a set-associative cache which are accessed in parallel. If a hit occurs in the direct-mapped cache, then the data is forwarded in the same clock cycle as the requested address is conveyed to the storage device. If a hit occurs in the set-associative cache, then the data is forwarded in a subsequent clock cycle and the associated cache line is moved into the direct-mapped cache. The cache line stored in the direct-mapped cache in the storage location that is to be used for the cache line being moved is stored into the set-associative cache in the location vacated by the moved line. In other words, the moved line and the line previously residing in the direct-mapped cache are swapped. In this manner, the most recently accessed cache line is stored in the direct-mapped cache and other recently accessed cache lines are stored in the set-associative cache. In many cases, multiple accesses are made to the same cache line relatively near each other. In these cases and others, many cache accesses will receive the benefit of the faster direct-mapped cache. However, the problems of thrashing and lower hit rates associated with direct-mapped caches are alleviated by storing lines in a set-associative cache. The effect of configuring a storage device in accordance with the present invention is to produce a storage device having multiple ways, where one of the ways has a shorter access time than the other ways.

Broadly speaking, the present invention contemplates a storage device comprising a first plurality of storage locations, a second plurality of storage locations, and an input bus. The first plurality of storage locations is configured as a linear array, and each of the first plurality of storage locations is configured to store a first plurality of bytes of information and a first associated tag identifying the first plurality bytes of information. The second plurality of storage locations is configured as an associative array, and each one of the second plurality of storage locations is configured to store a second plurality of bytes of information and a second associated tag identifying the second plurality of bytes of information. The input bus is coupled to the first plurality of storage locations and to the second plurality of storage locations. The input bus is configured to convey an input address for accessing the first plurality of storage locations and the second plurality of storage locations in parallel. The present invention further contemplates a superscalar microprocessor comprising a data cache configured as described above.

The present invention still further contemplates a method of operating a cache configured with multiple arrays with varying access times comprising several steps. First, the multiple arrays are accessed in parallel with an address. Second, a first plurality of bytes of information is received from a first of the multiple arrays during a first clock cycle if the address hits in the first of said multiple arrays. Third, a second plurality of bytes of information is received from a second of the multiple arrays during a second clock cycle subsequent to the first clock cycle if the address hits in the second of the multiple arrays.

BRIEF DESCRIPTION OF THE DRAWINGS

Other objects and advantages of the invention will become apparent upon reading the following detailed description and upon reference to the accompanying drawings in which.

Figure 1:
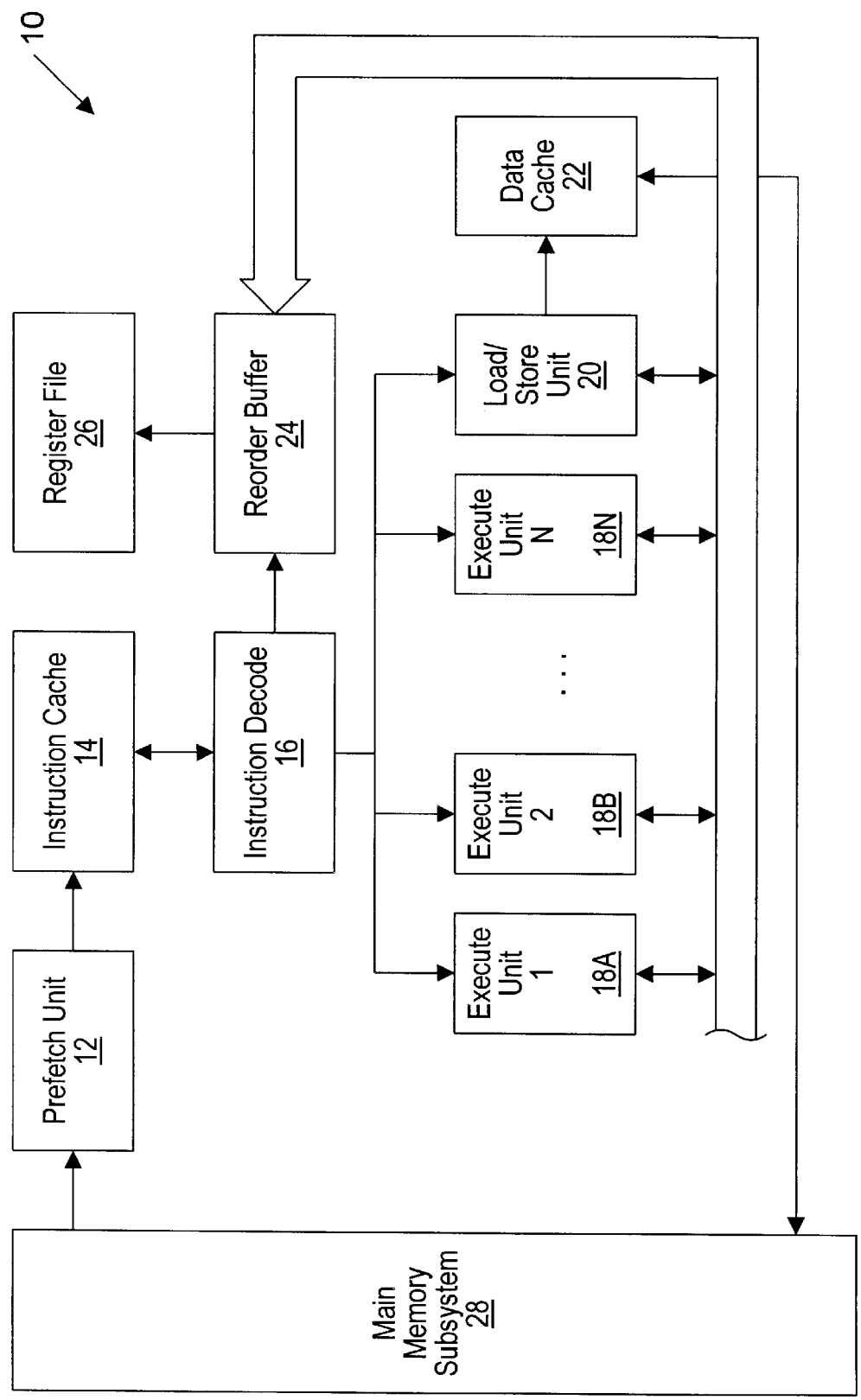
FIG. 1 is a block diagram of a typical superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of a typical superscalar microprocessor 10 is shown. Superscalar microprocessor 10 embodies an instruction cache 14 and a data cache 22 in accordance with the present invention. Microprocessor 10 is also configured with a prefetch unit 12, an instruction decode unit 16, a plurality of execute units 18A, 18B, through 18N, a load/store unit 20, a reorder buffer 24, and a register file 26. Execute units 18A, 18B, through 18N will be referred to collectively herein as execute units 18.

Before proceeding with a detailed discussion of portions of instruction cache 14 and data cache 22, general aspects of each unit in microprocessor 10 will be discussed. Prefetch unit 12 is used to fetch instructions from a main memory subsystem 28 into instruction cache 14. In one embodiment, prefetch unit 12 implements a predecoding scheme in which instructions are stored into instruction cache 14 in a partially decoded format. Prefetch unit 12 implements a prefetch scheme whereby instructions are fetched based on branch prediction information as well as fetching instructions in response to an instruction cache miss. It is noted that any prefetch scheme may be implemented by prefetch unit 12.

Generally speaking, instruction cache 14 is a high speed storage device for storing instruction bytes. Instruction cache 14 is a set-associative cache having a way with a fast access time and other ways with a slower access time. In one embodiment, the fast way may be accessed in a single clock cycle, while the slow ways require two clock cycles. Instruction cache 14 is written by prefetch unit 12, and receives fetch requests from instruction decode unit 16. In one embodiment, if instruction decode unit 16 is awaiting instructions that were an instruction cache miss, the instructions are forwarded to instruction decode unit 16 while the instructions are being written into instruction cache 14.

Instruction decode unit 16 is provided to decode multiple instructions per clock cycle from instruction cache 14 into a format suitable for execute units 18. Included in the decoding process is the reading of operand data from register file 26 and/or reorder buffer 24. If the operand is not available because a previous instruction updates the register and that previous instruction has not executed yet, then a reorder buffer tag is provided which indicates which reorder buffer update to scan for while the instruction is stored in one of execute units 18. Also, instruction decode unit 16 implements a branch prediction scheme, and communicates the results of the prediction as a next fetch address to instruction cache 14. It is noted that any suitable branch prediction scheme may be implemented by instruction decode unit 16.

In one embodiment, execute units 18 are symmetrical while in another embodiment execute units 18 are asymmetrical. Symmetrical execute units are units which embody identical functions. Asymmetrical execute units are units which embody dissimilar functions. For the asymmetrical execute unit embodiment, instruction decode unit 16 is further configured to route an instruction to a particular one of execute units 18 that is designed to execute that instruction. Execute units 18 are variously configured to execute arithmetic instructions, shift instructions, rotate instructions, logical instructions, and branch instructions. It is noted that a floating point unit (not shown) may be employed to execute floating point instructions.

In one embodiment, execute units 18 are configured with reservation stations which allow instructions which have not yet received the required operands for execution to be stored while other instructions are allowed to execute. Execute units 18 produce a result which is conveyed to reorder buffer 24. Execute units 18 monitor the buses conveying results to reorder buffer 24 for data that is required by instructions stored in their respective reservation stations. If the data is being provided, the execute unit captures the data and stores it with the associated instruction. This technique is commonly referred to as "result forwarding".

Broadly speaking, load/store unit 20 is configured to execute load and store instructions and to access data cache 22 on behalf of the load and store instructions. Load/store unit 20 routes the data requested by a load instruction to reorder buffer 24 and to execute units 18 via the result forwarding technique mentioned above. Load/store unit 20 also handles the dependency checking between load and store instructions. In one embodiment, load/store unit 20 is configured to speculatively execute load instructions to data cache 22.

Generally speaking, data cache 22 is a high speed storage device for storing data bytes. Data cache 22 is a set-associative cache having a way with a fast access time and other ways with a slower access time. In one embodiment, the fast way may be accessed in a single clock cycle, while the slow ways require two clock cycles. Data cache 22 is written with data bytes provided by main memory subsystem 28 and with data from store instructions executed by load/store unit 20.

Microprocessor 10 is configured to execute instructions out of order, and so employs reorder buffer 24 to ensure that register file 26 and main memory subsystem 28 are updated in correct program order. Embodiments of reorder buffer 24 often implement register renaming, which allows speculative storing of results until the results are known to be required by the execution of the program. When an instruction is routed to a particular execute unit 18, it is also allocated a temporary storage location within reorder buffer 24. The temporary storage locations within reorder buffer 24 are identified by a tag, and this tag is associated with the instruction as it is routed to its particular execute unit 18. When the instruction produces a result, the result is stored in the associated temporary storage location within reorder buffer 24.

As noted above, when instruction decode unit 16 decodes an instruction it requests the register operands from reorder buffer 24. Reorder buffer 24 checks its outstanding instructions to determine if any of the instructions will update the register. If not, then the value stored in register file 26 is provided. If one of the outstanding instructions will update the register, then the value stored with the outstanding instruction is provided or the reorder buffer tag of the entry is provided if the value is not yet available.

Reorder buffer 24 updates register file 26 with the results of an instruction when all previous instructions have completed. It also interfaces with load/store unit 20 to control the execution of store instructions and load instructions that miss the cache, because these instructions must execute non-speculatively.

Register file 26 holds the non-speculative state of the registers embodied in microprocessor 10. It interfaces with reorder buffer 24 in order to allow updates and reads of registers stored within it.

Figure 2:
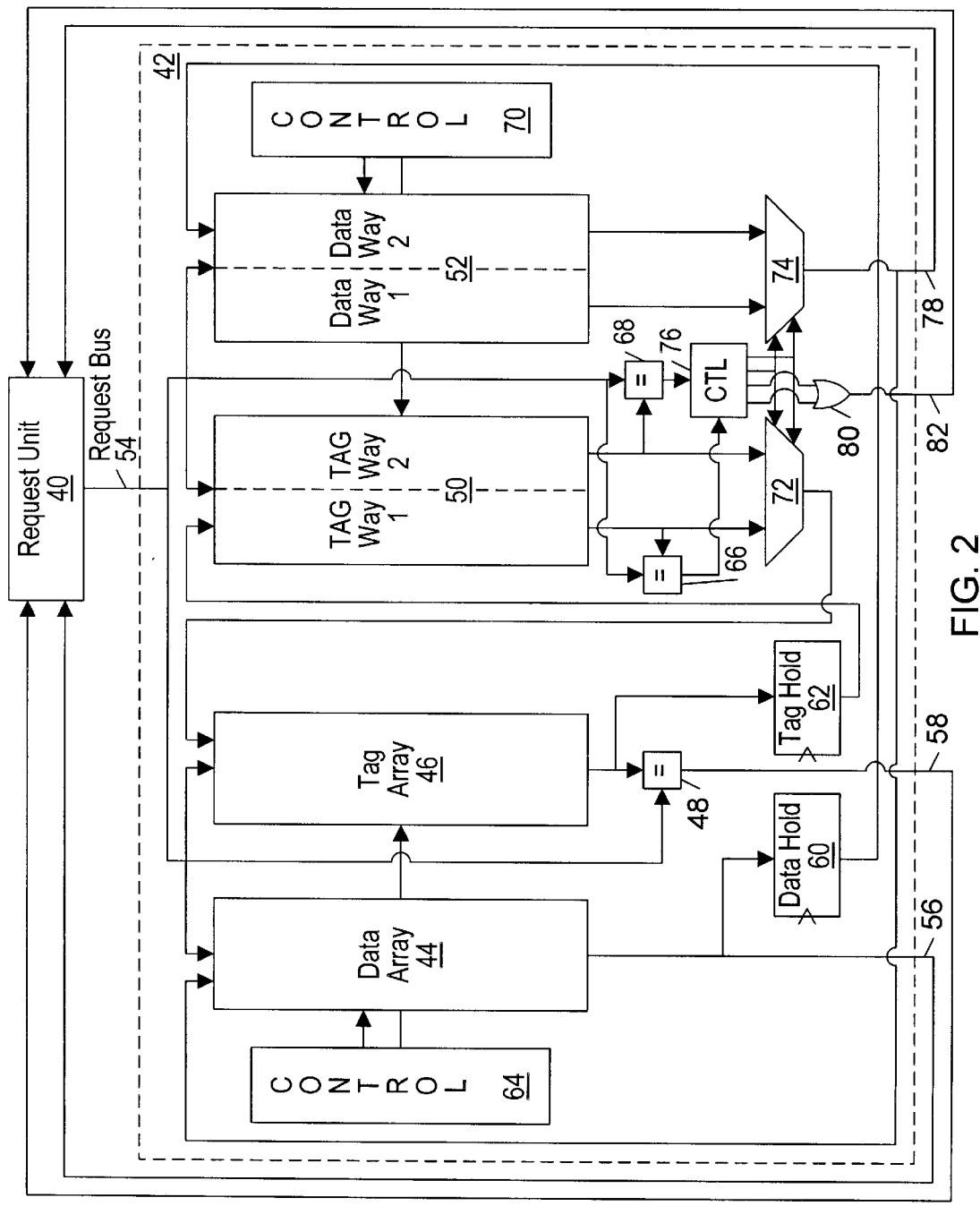
FIG. 2 is a diagram of a cache in accordance with the present invention connected to a request unit.

Turning now to FIG. 2, a request unit 40 is shown coupled via a request bus 54 to storage device 42 in accordance with the present invention. In one embodiment, storage device 42 is a data cache and request unit 40 is a load/store unit. In another embodiment, storage device 42 is an instruction cache and request unit 40 is an instruction decode unit or an instruction prefetch unit. Generally speaking, storage device 42 is configured with two sets of arrays which are accessed by request unit 40 in parallel. The first set of arrays is a direct-mapped cache comprised of a data array 44 and a corresponding tag array 46. This first array forms the "fast" way described above. The second set of arrays is a set-associative cache comprised of a data array 52 and a corresponding tag array 50. The second set of arrays forms the "slow" ways described above. The second set of arrays is "slow" because the data cannot be selected (via a selection device to be described below) until a tag comparison to a request address conveyed on request bus 54 is performed. Furthermore, the set-associative cache is slower in some embodiments because it has a significantly larger storage capacity than the direct-mapped cache.

In one embodiment, if the bytes of information corresponding to the requested address are stored within the direct-mapped cache, the bytes are available at the end of the clock cycle in which the request is made. However, if the bytes of information are stored within the set associative cache, then the bytes are available during a subsequent clock cycle. As will be described in further detail below, if the requested bytes of information are stored in data array 52, then the cache line containing the requested bytes is stored into data array 44 during the clock cycle in which the bytes are forwarded to request unit 40. The cache line that was stored in data array 44 at the index of the requested address is stored into data array 52. In other words, the two cache lines are swapped. In parallel with the above mentioned activity, the tags associated with the swapped cache lines from tag array 46 and from tag array 50 are similarly swapped. In this manner, the most recently used cache line associated with a particular index is moved to the "fast" way. Data arrays 44 and 52 and tag arrays 46 and 50 therefore form a storage device 42 with a variable access time. Much of the time storage device 42 provides data in the same cycle that the address request is conveyed on request bus 54 because the requested data resides in the "fast" way. When a miss in the "fast" way occurs, the data often will be stored in one of the "slow" ways. The higher hit rates and insensitivity to cache thrashing of a set-associative cache have advantageously been combined with the low access time of a direct-mapped cache.

Because data array 44 is direct-mapped, no comparison of tag addresses to the request address is necessary prior to selection of bytes to convey to the outputs of the array. Therefore, the output port of data array 44 is directly routed to request unit 40 on fast response data bus 56. A comparator circuit 48 is coupled to the output port of tag array 46 as well as to request bus 54. If the tag selected from tag array 46 compares equal to a respective number of high order bits of the address conveyed on request bus 54, then comparator circuit 48 conveys a signal indicating a cache hit. If the selected tag and the address on request bus 54 do not compare equal, then comparator circuit 48 conveys a signal indicating a cache miss. The hit/miss indication of comparator circuit 48 is routed to request unit 40 on a fast response hit/miss bus 58. Request unit 40 uses the hit/miss indication to determine if it should accept the data bytes on fast response data bus 56, or wait for a further response from the "slow" ways in a subsequent clock cycle. Additionally, if fast response hit/miss bus 58 indicates a hit, then the access being performed in the set-associative cache is cancelled.

Also coupled to the output port of data array 44 is a data hold register 60. Similarly, a tag hold register 62 is coupled to the output port of tag array 46. Data hold register 60 and tag hold register 62 capture the selected data cache line and tag each clock cycle. The outputs of data hold register 60 and tag hold register 62 are coupled to a write input port on data array 52 and tag array 50, respectively. Data hold register 60 and tag hold register 62 provide a temporary storage device for a cache line for the case where a request address misses the direct-mapped cache. The temporary storage device holds the cache line and tag information during the following clock cycle, in which the information is written to data array 52 and tag array 50.

A first control unit 64 is also coupled to data array 44 and tag array 46. The control unit controls when information conveyed on a write port to data array 44 and tag array 46 is written into the arrays. In one embodiment, control unit 64 is configured to cause data array 44 and tag array 46 to store the information conveyed on the write port in a clock cycle following a miss in data array 44 and tag array 46 if a hit is detected in the set-associative cache. Control unit 64 is further configured to cause a write during a clock cycle in which data is provided from external memory (not shown).

Data array 52 and tag array 50 are configured in a set-associative manner. As shown in FIG. 2, data array 52 and tag array 50 are 2-way set-associative. However, other levels of associativity may be implemented. Request bus 54 is coupled to the arrays, and the arrays select an indexed row of information in response to an address conveyed on request bus 54. For each way of the row, a comparator circuit is provided to compare the tag stored within that way to a respective number of high order bits of the request address. If none of the tags compare equal (i.e. a cache miss), then a particular way is selected for replacement according to a replacement algorithm. One popular and well-known replacement algorithm is the least recently used algorithm (LRU). The LRU algorithm causes the least recently accessed cache line in the indexed row to be replaced by the requested data in the case of a cache miss. Each time an access is performed to a cache implementing the LRU algorithm, the associated cache line is updated to the most recently used value. Each other cache line within the indexed row is updated such that a sequence of most recently used to least recently used values is maintained. LRU information is typically stored in tag array 50 with each tag. In the embodiment shown in FIG. 2, comparators 66 and 68 provide the function of indicating the hit way. A second control unit 70 provides the LRU update function.

Comparators 66 and 68 are coupled to a selection device for selecting the hit tag and cache line or the LRU way tag and cache line. In one embodiment, this selection device is a pair of multiplexors 72 and 74 and a multiplexor control circuit 76. If a comparator 66 or 68 indicates the requested address is a hit in the associated way, then control circuit 76 causes multiplexors 72 and 74 to select the corresponding tag and data outputs from tag array 50 and data array 52. If neither of comparators 66 or 68 indicates a hit, then control circuit 76 causes the LRU way's tag and data values to be selected by multiplexors 72 and 74. The output of multiplexor 74 is routed to request unit 40 on a slow response data bus 78. The hit indications from comparators 66 and 68 are logically OR'd together by OR gate 80 and conveyed to request unit 40 on a slow response hit/miss bus 82. Request unit 40 uses the hit/miss indication conveyed on slow response hit/miss bus 82 to determine whether or not to accept bytes conveyed on slow response data bus 78 as bytes associated with a request address provided in the previous clock cycle. The outputs of multiplexors 72 and 74 are further connected to replacement registers (not shown) that store the cache line and tag information for write back to main memory if the cache line is being removed due to a miss in storage device 42 and the cache line is modified with respect to main memory.

Second control unit 70 is also configured to cause tag array 50 and data array 52 to store values conveyed on a write port to the arrays. In one embodiment, control unit 70 is configured to cause a storing action in a clock cycle subsequent to a miss detected in the direct-mapped cache. The values stored are the tag and cache line from the storage location of the direct-mapped cache indexed by the miss address. If the requested address is a miss in the set-associative cache, the values are stored into the LRU way of the indexed row in tag array 50 and data array 52. The LRU way is then made the most recently used, and the LRU values of the other ways of the indexed row are adjusted accordingly. If a hit is detected in the set-associative cache, then the information from the direct-mapped cache is stored in the way in which the hit is detected. The way being stored to is then made the most recently used and the LRU values of the other ways of the indexed row are adjusted accordingly. The LRU way is determined by control circuit 70 from LRU information associated with the ways of the indexed row. By swapping cache lines and updating the LRU values as described above, the direct-mapped arrays and set-associative arrays form a pseudo-set-associative cache 42, with the direct-mapped cache containing the most-recently used way.

It is noted that the separate tag array 46 and data array 44 may be implemented as a single array storing tag and data information. Similarly, tag array 50 and data array 52 may be implemented as a single array. It is also noted that multiple request buses similar to request bus 54 may be employed in other embodiments. In other embodiments, other replacement algorithms are implemented by storage device 42. It is further noted that data array 44 and tag array 46 need not contain the same number of rows as data array 52 and tag array 50. Instead, data array 44 and tag array 46 may contain fewer or more rows than data array 52 and tag array 50. It is additionally noted that the write port on the arrays of the direct-mapped and set-associative cache may be eliminated in some embodiments by multiplexing the update onto the request port connected to request bus 54.

Figure 3:
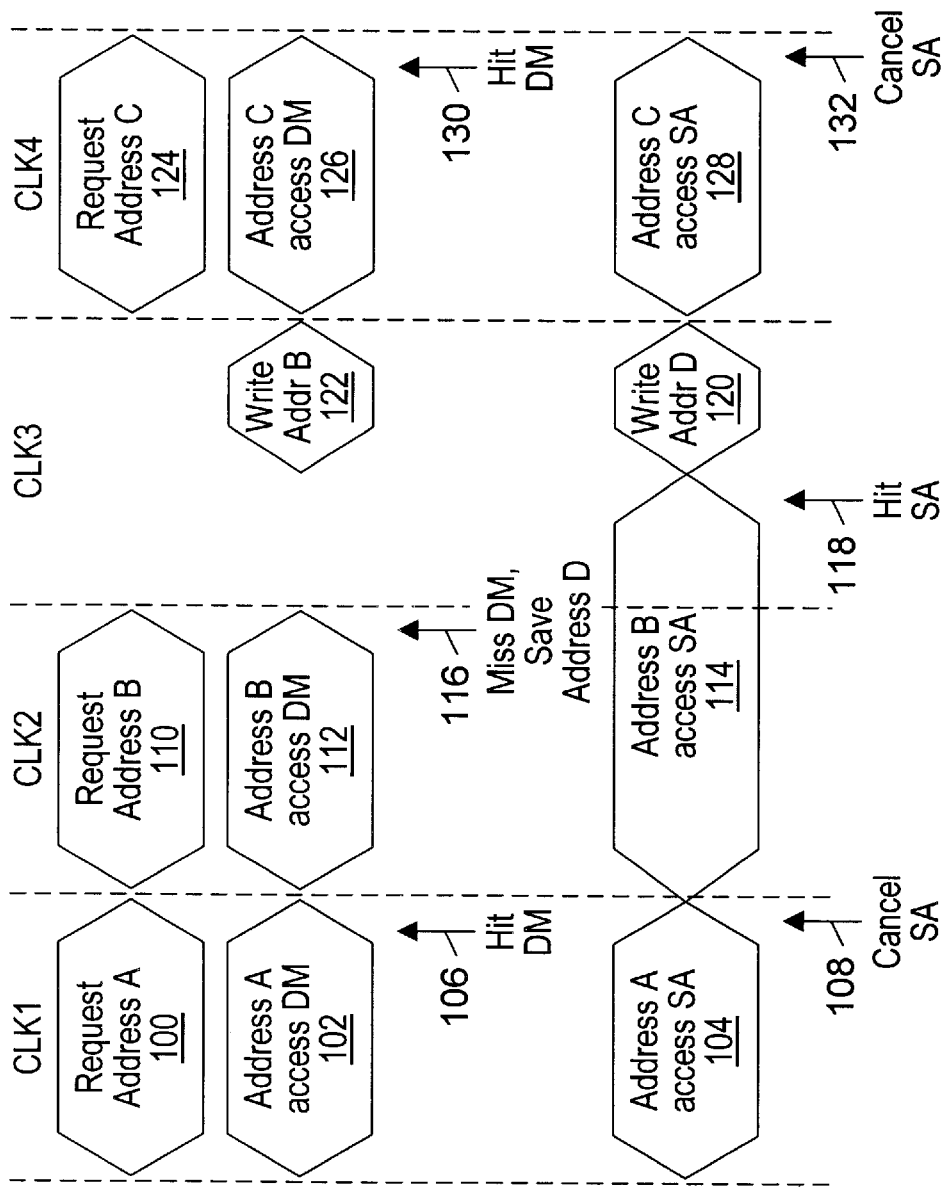
FIG. 3 is a timing diagram showing relationships of various components shown in FIG. 2.

Turning now to FIG. 3, a timing diagram of exemplary accesses to storage device 42 is shown to further illustrate the function of storage device 42. The timing diagram is divided into four equal units of time designated by the vertical dotted lines. Each unit of time is a clock cycle, and they are denoted as CLK1, CLK2, CLK3, and CLK4. During CLK1, request unit 40 conveys a request address A on request bus 54 (as indicated by block 100). Address A simultaneously begins an access to the direct-mapped array (DM in FIG. 3) and the set-associative array (SA in FIG. 3) within storage device 42, as indicated by blocks 102 and 104. Near the end of CLK1, address A is found to hit in the direct-mapped portion of storage device 42. The hit detection is denoted by arrow 106. Due to the hit in the direct-mapped portion of storage device 42, the access to the set-associative portion is cancelled. The cancellation is denoted by arrow 108.

Since address A is a hit in the direct-mapped portion of storage device 42, an access to an address B may begin in CLK2. As denoted by block 110, the request for address B is conveyed to storage device 42 in CLK2. As in CLK1 with address A, address B simultaneously accesses the direct-mapped portion and the set-associative portion of storage device 42 (indicated by blocks 112 and 114, respectively). Near the end of CLK2, address B is found to miss the direct mapped portion of storage device 42. Data and tag information associated with an address D which is stored in the storage location of the direct-mapped portion of storage device 42 indexed by address B is saved in data hold register 60 and tag hold register 62. The miss detection and the saving of information associated with address D is indicated by arrow 116.

The access of address B in the set-associative portion of storage device 42 continues into CLK3 because of the miss detected in CLK2 with respect to the direct-mapped portion. Therefore, a new request to storage device 42 may not begin in CLK3. During CLK3 (as indicated by arrow 118), a hit is detected for address B in the set-associative portion of storage device 42. The bytes and hit indication are conveyed to request unit 40 as shown in FIG. 2. Also, the information associated with address D is written into the storage location containing information associated with address B within the set-associative portion of storage device 42 as indicated by block 120. The information associated with address B is written into the direct-mapped portion of storage device 42, as indicated by block 122.

In CLK4, a new request is presented on request bus 54. The request is for an address C, as indicated by block 124. As in CLK1 with address A, address C simultaneously accesses the direct-mapped portion and the set-associative portion of storage device 42 (as indicated by blocks 126 and 128, respectively). Near the end of CLK4, address C is detected as a hit in the direct-mapped portion of storage device 42 and the access to the set-associative portion is cancelled (as indicated by arrows 130 and 132, respectively). In a subsequent clock cycle, another address request may be made.

Aspects regarding other portions of a superscalar microprocessor may be found in the co-pending, commonly assigned patent application entitled "High Performance Superscalar Microprocessor", Ser. No. 08/146,382, filed Oct. 29, 1993 by Witt, et al. Additionally, information may be found in the co-pending, commonly assigned patent application entitled "High Performance Superscalar Instruction Alignment Unit", Ser. No. 08/377,865, filed Jan. 25, 1995 by Tran, et al. The disclosures of both of the aforementioned applications are hereby incorporated by reference in their entirety.

In accordance with the above disclosure, a storage device having variable access times is described. The access time for a particular request depends upon which of the multiple storage arrays a requested datum is stored within. The storage device combines the access speed of a direct-mapped cache configuration with the hit rate and thrashing insensitivity of a set-associative configuration. In many cases, most of the cache accesses will find requested data in the direct-mapped portion and will receive the requested data quickly. Of cache accesses which miss the direct-mapped portion, many will receive the requested data from the set-associative portion with only a single clock cycle penalty. The combined cache acts as a set-associative cache with a way that responds faster than the other ways.

Numerous variations and modifications will become apparent to those skilled in the art once the above disclosure is fully appreciated. It is intended that the following claims be interpreted to embrace all such variations and modifications.

What is claimed is:

1. A storage device comprising:

a direct-mapped array including a first plurality of storage locations wherein each one of said first plurality of storage locations is configured to store a first plurality of bytes of information and a first associated tag identifying said first plurality of bytes of information, and wherein said direct-mapped array is configured to provide a first selected plurality of bytes of information and a first selected tag corresponding to said first selected plurality of bytes of information from one of said first plurality of storage locations in response to an input address;

a set-associative array including a second plurality of storage locations wherein each one of said second plurality of storage locations is configured to store a second plurality of bytes of information and a second associated tag identifying said second plurality of bytes of information, and wherein said set-associative array is configured to provide a selected plurality of said second plurality of bytes of information and a plurality of said second associated tags corresponding to said selected plurality of said second plurality of bytes of information in response to said input address, and wherein said input address is concurrently provided to said direct-mapped array and said set-associative array, and wherein said selected plurality of said second plurality of bytes of information and said plurality of said second associated tags are stored in a selected plurality of said second plurality of storage locations;

a data hold register coupled between said direct-mapped array and said set-associative array, wherein said data hold register is configured to store said first selected plurality of bytes of information and to convey said first selected plurality of bytes of information to said set-associative array for storage;

a tag hold register coupled between said direct-mapped array and said set-associative array, wherein said tag hold register is configured to store said first selected tag and to convey said first selected tag to said set-associative array for storage; and a control unit coupled to said set-associative array, wherein said control unit is configured to cause said set-associative array to store said first selected plurality of bytes of information, provided from said data hold register, and said first selected tag, provided from said tag hold register, if said input address is a miss in said direct-mapped array.

2. The storage device as recited in claim 1, wherein said set-associative array is configured with a plurality of ways, and wherein said control unit is configured to cause said set-associative array to store said first selected plurality of bytes of information and said first selected tag into a selected way of said set-associative array upon detection of said miss in said direct-mapped array.

3. The storage device as recited in claim 2, wherein said selected way comprises a particular way of said set-associative array in which said input address hits.

4. The storage device as recited in claim 2, wherein said selected way comprises a least-recently used one of said plurality of ways, if said input address misses in said associative array.

5. The storage device as recited in claim 1, wherein said direct-mapped array is configured to assert a hit signal if said input address hits in said direct-mapped array, and wherein said set-associative array is configured to cancel a corresponding access to said second plurality of storage locations if said hit signal indicates a hit in said direct-mapped array.

6. A storage device comprising:

a direct-mapped array including a first plurality of storage locations wherein each one of said first plurality of storage locations is configured to store a first plurality of bytes of information and a first associated tag identifying said first plurality of bytes of information, and wherein said direct-mapped array is configured to provide a first selected plurality of bytes of information and a first selected tag corresponding to said first selected plurality of bytes of information from one of said first plurality of storage locations in response to an input address;

a set-associative array including a second plurality of storage locations wherein each one of said second plurality of storage locations is configured to store a second plurality of bytes of information and a second associated tag identifying said second plurality of bytes of information, and wherein said set-associative array is configured to provide a selected plurality of said second plurality of bytes of information and a plurality of said second associated tags corresponding to said selected plurality of said second plurality of bytes of information in response to said input address, and wherein said input address is concurrently provided to said direct-mapped array and said set-associative array, and wherein said selected plurality of said second plurality of bytes of information and said plurality of said second associated tags are stored in a selected plurality of said second plurality of storage locations;

a data hold register coupled between said direct-mapped array and said set-associative array, wherein said data hold register is configured to store said first selected plurality of bytes of information and to convey said first selected plurality of bytes of information to said set-associative array for storage;

a tag hold register coupled between said direct-mapped array and said set-associative array, wherein said tag hold register is configured to store said first selected tag and to convey said first selected tag to said set-associative array for storage; and a control unit coupled to said set-associative array, wherein said control unit is configured to cause said set-associative array to store said first selected plurality of bytes of information, provided from said data hold register, and said first selected tag, provided from said tag hold register, if said input address is a miss in said direct-mapped array;

wherein said set-associative array is configured with a plurality of ways, and wherein said control unit is configured to cause said set-associative array to store said first selected plurality of bytes of information and said first selected tag into a selected way of said set-associative array upon detection of said miss in said direct-mapped array; and wherein said direct-mapped array is configured to assert a hit signal if said input address hits in said direct-mapped array, and wherein said set-associative array is configured to cancel a corresponding access to said second plurality of storage locations if said hit signal indicates a hit in said direct-mapped array.

* * * * *